(12) United States Patent
Xue et al.

(10) Patent No.: US 10,606,806 B2
(45) Date of Patent: Mar. 31, 2020

(54) METHOD AND APPARATUS FOR STORING TIME SERIES DATA

(71) Applicant: Beijing Baidu Netcom Science and Technology Co., Ltd., Beijing (CN)

(72) Inventors: Yingfei Xue, Beijing (CN); Chunbo Lai, Beijing (CN); Pu Wang, Beijing (CN); Bo Zhao, Beijing (CN); Feng Zheng, Beijing (CN)

(*) Notice: Subject to any disclaimer, the term of this patent is extended or adjusted under 35 U.S.C. 154(b) by 22 days.

(21) Appl. No.: 15/533,966

(22) PCT Filed: Nov. 26, 2015

(86) PCT No.: PCT/CN2015/095636
§ 371 (c)(1),
(2) Date: Jun. 7, 2017

(87) PCT Pub. No.: WO2017/049757
PCT Pub. Date: Mar. 30, 2017

(65) Prior Publication Data
US 2018/0329921 A1    Nov. 15, 2018

(30) Foreign Application Priority Data
Sep. 22, 2015   (CN) .......................... 2015 1 0608162

(51) Int. Cl.
G06F 16/00      (2019.01)
G06F 16/174     (2019.01)
(Continued)

(52) U.S. Cl.
CPC .......... *G06F 16/1744* (2019.01); *G06F 3/064* (2013.01); *G06F 3/0608* (2013.01);
(Continued)

(58) Field of Classification Search
None
See application file for complete search history.

(56) References Cited

U.S. PATENT DOCUMENTS

| 2007/0147519 | A1* | 6/2007 | Takayama | ............... | H03M 7/30 |
| | | | | | 375/246 |
| 2014/0040276 | A1 | 2/2014 | Chen et al. | | |

(Continued)

FOREIGN PATENT DOCUMENTS

| CN | 102792282 A | 11/2012 |
| CN | 103577456 A | 2/2014 |
| CN | 103605805 A | 2/2014 |

OTHER PUBLICATIONS

International Search Report, dated Jun. 24, 2015, for International Application No. PCT/CN2015/095636, 6 pages.

*Primary Examiner* — Bai D Vu
(74) *Attorney, Agent, or Firm* — Seed IP Law Group LLP

(57) ABSTRACT

A method and apparatus for storing time series data are disclosed. A method may include: saving an index value of time series data to a time interval data table according to a time point of the time series data, wherein the time series data includes: a time point and an index value associated with the time point, and each data row in the time interval data table records index values associated with at least one time point within a time interval of a predetermined length; performing data compression processing on a storage area having no written data, to obtain compressed time interval data; and writing the compressed time interval data to a magnetic disk.

27 Claims, 4 Drawing Sheets

(51) Int. Cl.
*G06F 16/22* (2019.01)
*G06F 16/2458* (2019.01)
*G06F 3/06* (2006.01)

(52) U.S. Cl.
CPC ........ *G06F 3/0673* (2013.01); *G06F 16/2228* (2019.01); *G06F 16/2477* (2019.01)

(56) References Cited

U.S. PATENT DOCUMENTS

2015/0106578 A1* 4/2015 Warfield ............... G06F 3/0613
711/158
2016/0012086 A1* 1/2016 Gaumnitz ........... G06F 16/2477
707/741

* cited by examiner

| storage area status | storage area | storage area | storage area | storage area | storage area | storage area | storage area | ... |
|---|---|---|---|---|---|---|---|---|
| 1100101... | 100 | 90 | | | 80 | | 90 | ... |

| storage area status | storage area | storage area | storage area | storage area | ... |
|---|---|---|---|---|---|
| 1100101... | 100 | 90 | 80 | 90 | ... |

METHOD AND APPARATUS FOR STORING TIME SERIES DATA

CROSS-REFERENCE TO RELATED APPLICATION

This application is related to and claims priority from Chinese Application Ser. No. 201510608162.8, filed on Sep. 22, 2015, entitled "Method and apparatus for storing time series data" by Beijing Baidu Netcom Science And Technology Co., Ltd., the entire disclosure of which is hereby incorporated by reference.

TECHNICAL FIELD

The present application relates to the field of computer technology, particularly to the field of database technology, and more particularly to a method and apparatus for storing time series data.

BACKGROUND

Time series data is a series of time-ordered data collected at different points in time. Such data reflects the change of an object, phenomenon, indicator and so on over time. Because time series data generally is data sampled at equal time intervals, existing methods for storing time series data are generally: reserving a storage area for each time point according to the above-mentioned time interval; upon receiving time series data of a time point, writing the data to the storage area reserved for the time point.

However, currently in practice, time series data may not always be generated after every time interval, or even the time interval may change. Consequently, there are a large amount of data including null values in the storage area. If such data including null values is directly written to a magnetic disk, large storage space is occupied, and I/O traffic during subsequent data read/write is increased.

SUMMARY

An objective of the present application is to provide a method and apparatus for storing time series data, in order to solve the technical problem mentioned in the foregoing Background section.

According to a first aspect, the present application provides a method for storing time series data. The method comprises: saving an index value of time series data to a time interval data table according to a time point of the time series data, wherein the time series data comprises the following information: a time point and an index value associated with the time point, each data row in the time interval data table records index values associated with at least one time point within a time interval of a predetermined length, the time points in the at least one time point are spaced by a predetermined time length, each time point occupies one storage area of a memory, each storage area comprises a predetermined quantity of bytes, and the index value associated with each time point is filled in the storage area occupied by the time point; performing data compression processing on a storage area having no written data, to obtain compressed time interval data; and writing the compressed time interval data to a magnetic disk.

In some embodiments, the time interval data table comprises a primary key column, and the primary key value of each data row in the time interval data table comprises a starting time point value indicating the starting point of the time interval corresponding to the data row.

In some embodiments, the saving an index value of time series data to a time interval data table according to a time point of the time series data comprises: searching, in the time interval data table according to the time point of the time series data, for a data row corresponding to a time interval comprising the time point of the time series data; if the corresponding data row is found, writing the index value of the time series data to the storage area in the data row that corresponds to the time point; and if the data row is not found, adding a new data row, wherein a primary key value of the new data row comprises the time point of the time series data, and data written to the first storage area of the new data row is the index value of the time series data.

In some embodiments, the time series data further comprises data source subject identification code information, wherein the data source subject identification code information is an identification code of a source subject of the time series data.

In some embodiments, the primary key value of the each data row further comprises a data source subject identification code, wherein the data source subject identification code is an identification code of a source subject of index value data of the data row.

In some embodiments, the searching, in the time interval data table according to the time point of the time series data, for a data row corresponding to a time interval comprising the time point of the time series data comprises: searching, in the time interval data table according to the time point and the data source subject identification code of the time series data, for a data row that corresponds to a time interval comprising the time point of the time series data and of which the primary key value comprises the data source subject identification code of the time series data.

In some embodiments, the primary key value of the new data row further comprises the data source subject identification code of the time series data.

In some embodiments, the time series data further comprises information about an index identification code, wherein the index identification code is an identification code of an index corresponding to the index value of the time series data.

In some embodiments, the primary key value of the each data row further comprises a index identification code, wherein the index identification code is an identification code of an index corresponding to the index value recorded in the data row.

In some embodiments, the searching, in the time interval data table according to the time point of the time series data, for a data row corresponding to a time interval comprising the time point of the time series data comprises: searching, in the time interval data table according to the time point, the data source subject identification code and the index identification code of the time series data, for a data row that corresponds to a time interval comprising the time point of the time series data and of which the primary key value comprises the data source subject identification code and the index identification code of the time series data.

In some embodiments, the primary key value of the new data row further comprises the index identification code of the time series data.

In some embodiments, the time interval data table further comprises an index value data set column used for recording the index values of the at least one time point.

In some embodiments, the index value data set column is further used for recording storage area status information, wherein the storage area status information in each data row in the time interval data table comprises an occupation status of each storage area in the data row, and the occupation status indicates whether there is data written to the storage area; and the performing data compression processing on a storage area having no written data comprises: performing data compression processing on a storage area that is in an idle state.

According to a second aspect, the present application provides an apparatus for storing time series data. The apparatus comprises: a data storage unit, configured to save an index value of time series data to a time interval data table according to a time point of the time series data, wherein the time series data comprises the following information: a time point and an index value associated with the time point, each data row in the time interval data table records index values associated with at least one time point within a time interval of a predetermined length, the time points in the at least one time point are spaced by a predetermined time length, each time point occupies one storage area of a memory, each storage area comprises a predetermined quantity of bytes, and the index value associated with each time point is filled in the storage area occupied by the time point; a data compression unit, configured to perform data compression processing on a storage area having no written data, to obtain compressed time interval data; and a data writing unit, configured to write the compressed time interval data to a magnetic disk.

In some embodiments, the time interval data table comprises a primary key column, and the primary key value of each data row in the time interval data table comprises a starting time point value indicating the starting point of the time interval corresponding to the data row.

In some embodiments, the data storage unit comprises: a data row searching subunit, configured to search, in the time interval data table according to the time point of the time series data, for a data row corresponding to a time interval comprising the time point of the time series data; a data writing subunit, configured to: if the corresponding data row is found, write the index value of the time series data to the storage area in the data row that corresponds to the time point; and a data row adding subunit, configured to: if the data row is not found, add a new data row, wherein a primary key value of the new data row comprises the time point of the time series data, and data written to the first storage area of the new data row is the index value of the time series data.

In some embodiments, the time series data further comprises data source subject identification code information, wherein the data source subject identification code information is an identification code of a source subject of the time series data.

In some embodiments, the primary key value of the each data row further comprises a data source subject identification code, wherein the data source subject identification code is an identification code of a source subject of index value data of the data row.

In some embodiments, the data row searching subunit is further configured to search, in the time interval data table according to the time point and the data source subject identification code of the time series data, for a data row that corresponds to a time interval comprising the time point of the time series data and of which the primary key value comprises the data source subject identification code of the time series data.

In some embodiments, the primary key value of the new data row further comprises the data source subject identification code of the time series data.

In some embodiments, the time series data further comprises information about an index identification code, wherein the index identification code is an identification code of an index corresponding to the index value of the time series data.

In some embodiments, the primary key value of the each data row further comprises a index identification code, wherein the index identification code is an identification code of an index corresponding to the index value recorded in the data row.

In some embodiments, the data row searching subunit is further configured to search, in the time interval data table according to the time point, the data source subject identification code and the index identification code of the time series data, for a data row that corresponds to a time interval comprising the time point of the time series data and of which the primary key value comprises the data source subject identification code and the index identification code of the time series data.

In some embodiments, the primary key value of the new data row further comprises the index identification code of the time series data.

In some embodiments, the time interval data table further comprises an index value data set column used for recording the index values of the at least one time point.

In some embodiments, the index value data set column is further used for recording storage area status information, wherein the storage area status information in each data row in the time interval data table comprises an occupation status of each storage area in the data row, and the occupation status indicates whether there is data written to the storage area; and the data compression unit is further configured to perform data compression processing on a storage area that is in an idle state.

According to the method and apparatus for storing time series data as provided in the present application, before data is written to a magnetic disk, data compression processing is performed on a storage area having no written data, thereby reducing the occupation of the storage space of the magnetic disk and reducing the IO traffic during subsequent data read/write.

BRIEF DESCRIPTION OF THE DRAWINGS

Other features, objectives and advantages of the present application will become more apparent upon reading the detailed description to non-limiting embodiments with reference to the accompanying drawings.

DETAILED DESCRIPTION OF EMBODIMENTS

The present application will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
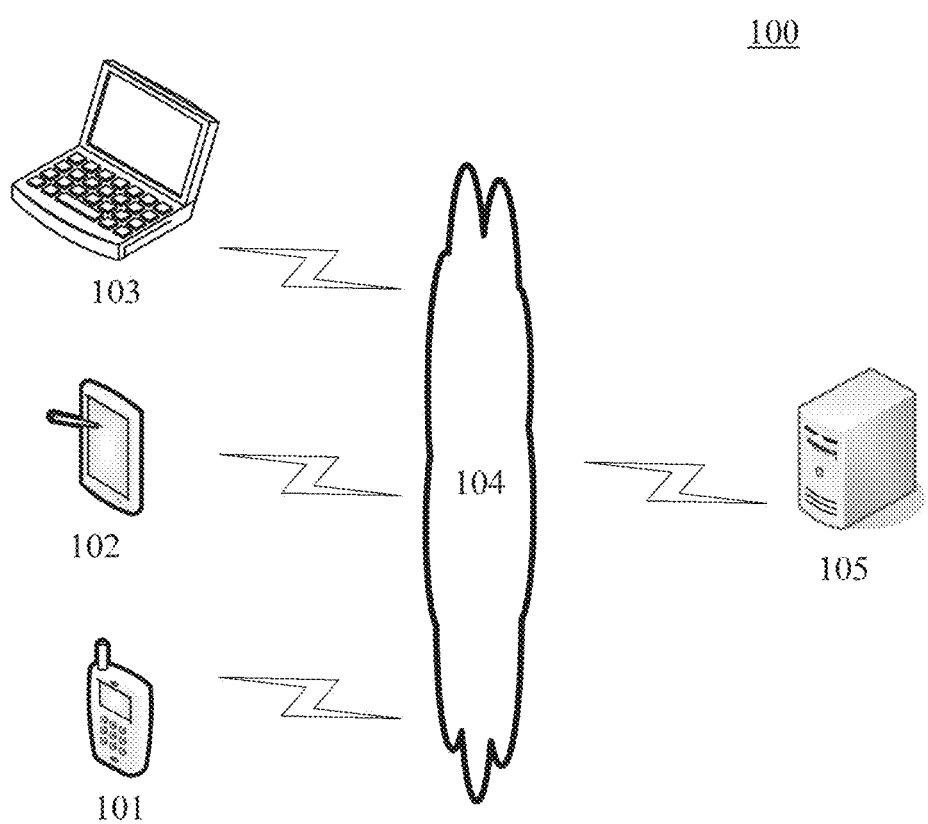
FIG. 1 is an architectural diagram of an exemplary system in which the present application may be implemented.

FIG. 1 shows an exemplary architecture of a system 100 which may be used by a method or apparatus for storing time series data according to the embodiments of the present application.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The terminal devices 101, 102 and 103 interact with the server 105 through the network 104, in order to transmit or receive data etc. Various client applications (for example, computer management applications) and different monitoring devices, for example devices monitoring CPU and memory usage, may be installed on the terminal devices 101, 102 and 103.

The terminal devices 101, 102 and 103 may be various electronic devices capable of interacting with the server, including but not limited to, smart phones, tablet computers, e-book readers, MP3 (Moving Picture Experts Group Audio Layer III) players, MP4 (Moving Picture Experts Group Audio Layer IV) players, laptop computers and desktop computers.

The server 105 may be a server providing various services, for example, a database server or a cloud server providing support for the computer management applications on the terminal devices 101, 102 or 103. The server may perform a processing such as storage and analysis on received data, and return a processing result to the terminal devices.

It should be noted that the method for storing time series data according to the embodiments of the present application is generally executed by the server 105. Accordingly, an object data updating apparatus is generally installed on the server 105.

It should be appreciated that the numbers of the terminal devices, the networks and the servers in FIG. 1 are merely illustrative. Any number of terminal devices, networks and servers may be provided based on the actual requirements.

Figures 2, 3A:
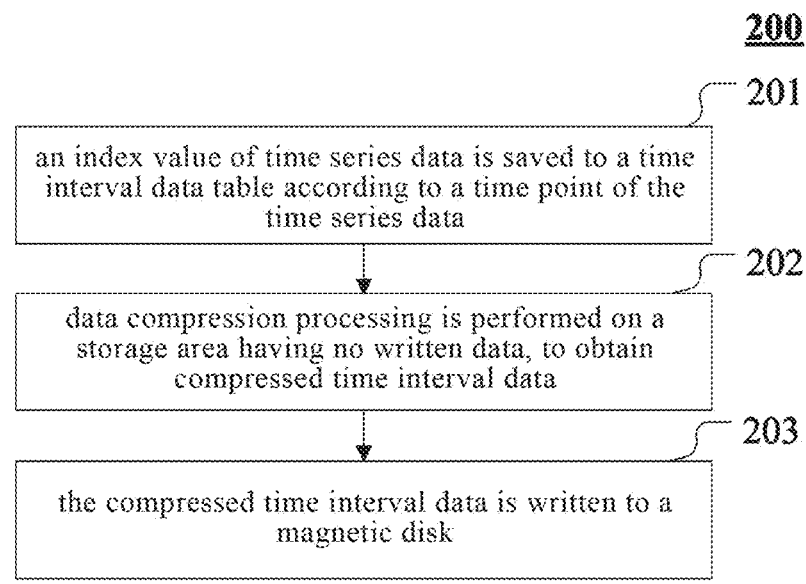
FIG. 2 is a flow chart of a method for storing time series data according to an embodiment of the present application.
FIG. 3a is a schematic diagram of a storage structure of data stored in a memory according to the method for storing time series data of the embodiment shown in FIG. 2.

Further, referring to FIG. 2, FIG. 2 is a flow chart of a method for storing time series data according to an embodiment of the present application.

As shown in FIG. 2, a flow 200 of the method for storing time series data according to the present application includes the following steps:

At step 201, an index value of time series data is saved to a time interval data table according to a time point of the time series data.

The time series data includes the following information: a time point and an index value associated with the time point. Each data row in the time interval data table records index values associated with at least one time point within a time interval of a predetermined length, the time points in the at least one time point are spaced by a predetermined time length, each time point occupies one storage area of a memory, each storage area includes a predetermined quantity of bytes, and the index value associated with each time point is filled in the storage area occupied by the time point.

In this embodiment, the time interval data table includes a primary key column, and the primary key value of each data row in the time interval data table may include a starting time point value indicating the starting point of the time interval corresponding to the data row. For example, the primary key values of some data rows in the time interval data table may be expressed as:

| primary key | ... |
|---|---|
| timestamp0000 | ... |
| timestamp3600 | ... |
| timestamp7200 | ... |

In the above table, each row records data within a time interval of a time length of 3600 seconds (that is, 1 hour). The data row of which the primary key value is "timestamp3600" records index values associated with time points from the 3600th second to the 7200th second (that is, within the second hour).

Correspondingly, a server on which the method for storing time series data runs may search, in the time interval data table according to the time point of the time series data, for a data row corresponding to a time interval including the time point of the time series data; if the corresponding data row is found, writing the index value of the time series data to the storage area in the data row that corresponds to the time point; and if the data row is not found, adding a new data row, where a primary key value of the new data row includes the time point of the time series data, and data written to the first storage area of the new data row is the index value of the time series data.

The index values of the at least one time point may be stored in one column of the time interval data table. Therefore, the time interval data table may further include an index value data set column used for recording the index values of the at least one time point. For example, some data rows in the time interval data table may be expressed as:

| primary key | index value data set column | | | ... |
|---|---|---|---|---|
| Instance1_timestamp0000 | 0.99 | 0.97 | ... | ... |
| Instance1_timestamp3600 | 200 | 201 | ... | ... |
| Instance2_timestamp0000 | ... | | | ... |
| Instance2_timestamp3600 | ... | | | ... |

In the above table, data in the primary key column can be referred to the above description of the primary key column, and each subcolumn in the index value data set column represents one storage area. The index value data set column may include multiple storage areas, each storage area corresponds to one time point, and the time points corresponding to neighboring storage areas are spaced by a same time length.

In some implementations, the time interval data table may further include a time interval column used for recording the time length by which the time points corresponding to neighboring storage areas are spaced.

According to the above method for saving the index value of the time series data to the time interval data table, index values associated with multiple time points within one time interval are stored in a same data row. thereby greatly reducing the number of rows required for storing the time series data, and reducing the occupation of the storage space.

At step 202, data compression processing is performed on a storage area having no written data, to obtain compressed time interval data.

In this embodiment, if the index value data set column is used to record the index values of the at least one time point, the index value data set column may further be used for recording storage area status information, where the storage area status information in each data row in the time interval data table includes an occupation status of each storage area in the data row, and the occupation status indicates whether there is data written to the storage area. For example, assuming that one data row includes 4 storage areas, the value of the storage area status information may be 1101. This value indicates that the third storage area in the data row is empty.

Correspondingly, step 202 may include: performing data compression processing on a storage area that is in an idle state.

At step 203, the compressed time interval data is written to a magnetic disk.

In this embodiment, the above-mentioned data saved in the time interval data table is saved to the storage area in the memory, and by means of the processing in step 202, the storage space occupied by the above-mentioned data in the memory is greatly reduced. Then, the server writes the compressed time interval data obtained after the processing to a magnetic disk.

Figures 3B, 4:
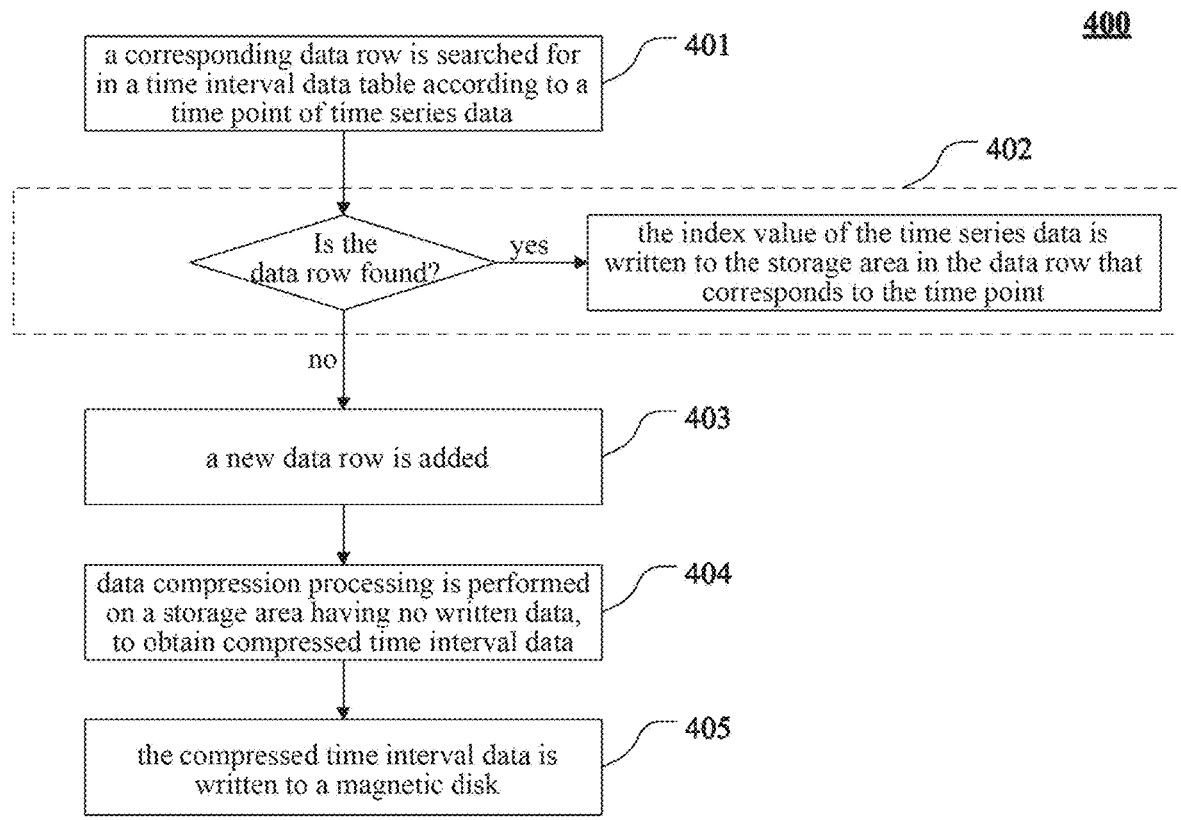
FIG. 3b is a schematic diagram of a storage structure of data stored in a magnetic disk according to the method for storing time series data of the embodiment shown in FIG. 2.
FIG. 4 is a flow chart of a method for storing time series data according to another embodiment of the present application.

Further, referring to FIG. 3*a* and FIG. 3*b*, FIG. 3*a* is a schematic diagram of a storage structure of data stored in a memory according to the method for storing time series data of the embodiment shown in FIG. 2, and FIG. 3*b* is a schematic diagram of a storage structure of data stored in a magnetic disk according to the method for storing time series data of the embodiment shown in FIG. 2. As can be seen from FIG. 3*a* and FIG. 3*b*, the storage space occupied by the time series data in the magnetic disk is much smaller than that occupied in the memory.

According to the method for storing time series data as provided in the present application, before data is written to a magnetic disk, data compression processing is performed on a storage area having no written data, thereby reducing the occupation of the storage space of the magnetic disk and reducing the IO traffic during subsequent data read/write.

Further, referring to FIG. 4, FIG. 4 is a flow chart of a method for storing time series data according to another embodiment of the present application.

As shown in FIG. 4, a flow 400 of the method for storing time series data according to the present application includes the following steps:

At step 401, a data row corresponding to a time interval including a time point of time series data is searched for in a time interval data table according to the time point of the time series data.

The time series data includes the following information: a time point, an index value associated with the time point, and data source subject identification code information, where the data source subject identification code information is an identification code of a source subject of the time series data. Each data row in the time interval data table is used for recording index values of one data source subject that are associated with at least one time point within a time interval of a predetermined length, the time points in the at least one time point are spaced by a predetermined time length, each time point occupies one storage area of a memory, each storage area includes a predetermined quantity of bytes, and the index value associated with each time point is filled in the storage area occupied by the time point.

The time interval data table includes a primary key column and an index value data set column. The primary key value of each data row in the time interval data table includes a starting time point value indicating the starting point of the time interval corresponding to the data row, and a data source subject identification code, where the data source subject identification code is an identification code of a source subject of index value data of the data row. The index value data set column is used for recording the index values of the at least one time point. For example, Instance1 represents machine A, and data in a row of which the primary key value is "Instance1 timestamp3600" records index values of machine A that are associated with the time points within the second hour.

Based on the data structures of the time series data and the time interval data table, step 401 is specifically: searching, in the time interval data table according to the time point and the data source subject identification code of the time series data, for a data row that corresponds to a time interval including the time point of the time series data and of which the primary key value includes the data source subject identification code of the time series data.

In some implementations, the time interval data table may further include a time interval column used for recording the time length by which the time points corresponding to neighboring storage areas are spaced.

According to the above method for saving the index value of the time series data to the time interval data table as provided in this embodiment, index values of a data source subject that are associated with multiple time points within one time interval are stored in a same data row. thereby greatly reducing the number of rows required for storing the time series data, and reducing the occupation of the storage space.

At step 402, if the corresponding data row is found, the index value of the time series data is written to the storage area in the data row that corresponds to the time point.

For example, for the time series data, the data source subject identification code is "Instance1", the time point is the 7100th second, and the index value is 0.97. After the time series data is saved to the time interval data table, the primary key value of the corresponding data row found is "Instance1_timestamp3600". Assuming that the storage areas in the data row are spaced by 100 seconds, the index value data set column of the data row includes a total of 36 storage areas. Therefore, 0.97 is written to the 36th storage area.

At step 403, if the data row is not found, a new data row is added.

In this embodiment, a primary key value of the new data row includes the time point of the time series data and the data source subject identification code of the time series data, and data written to the first storage area of the new data row is the index value of the time series data. For example, for the time series data, the data source subject identification code is "Instance1", the time point is the 7200th second, and the index value is 0.97. After the time series data is saved to the time interval data table, the primary key value of a new data row added may be "Instance1_timestamp7200", and data written to the first storage area in the data row is 0.97.

At step 404, data compression processing is performed on a storage area having no written data, to obtain compressed time interval data.

In this embodiment, specific implementation of step 404 can be referred to the detailed description of step 202 in the embodiment shown in FIG. 2, and will not be repeatedly described here.

At step 405, the compressed time interval data is written to a magnetic disk.

In this embodiment, specific implementation of step 405 can be referred to the detailed description of step 203 in the embodiment shown in FIG. 2, and will not be repeatedly described here.

In some implementations of this embodiment, the time series data may further include information about an index identification code, where the index identification code is an identification code of an index corresponding to the index value of the time series data. For example, the index value of the time series data acquired by a terminal device is a CPU performance value of machine A, and "CPU" may be used as the index identification code of the time series data. Correspondingly, the primary key value of each data row in the time interval data table may further include an index identification code, where the index identification code is an identification code of an index corresponding to the index value recorded in the data row. For example, the primary key value of a data row may be "Instance1_timestamp3600_MEM", indicating that data recorded in this data row is memory index values of the machine corresponding to Instance1 at time points within the second hour.

Based on the data structure in this implementation, step 402 may include: searching, in the time interval data table according to the time point, the data source subject identification code and the index identification code of the time series data, for a data row that corresponds to a time interval including the time point of the time series data and of which the primary key value includes the data source subject identification code and the index identification code of the time series data. In addition, the primary key value of the new data row in step 403 may further include the index identification code of the time series data.

According to this implementation, the data row of the time interval data table further has a dimension of index identification code, so that data of different indexes can be stored and distinguished.

As can be seen from FIG. 4, compared with the embodiment corresponding to FIG. 2, in the method for storing time series data according to this embodiment, the time series data and the time interval data table have more dimensions so that the number of dimensions of the data source subject is increased, and the step of saving the time series data to the time interval data table is also adjusted correspondingly. Whereby, the solution provided in this embodiment can store and distinguish data of different data source subjects and even data of different indexes.

Figure 5:
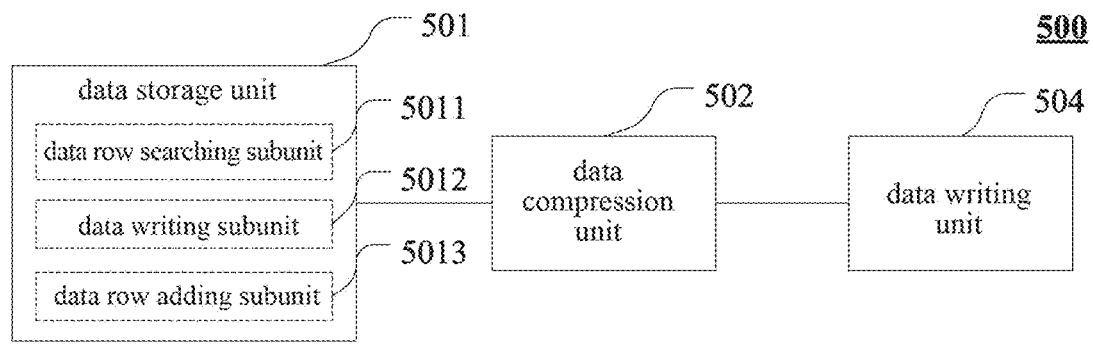
FIG. 5 is a schematic structural diagram of an apparatus for storing time series data according to an embodiment of the present application.

Further, referring to FIG. 5, as an implementation of the methods shown in the above-mentioned figures, the present application provides an embodiment of an apparatus for storing time series data. This apparatus embodiment corresponds to the method embodiment shown in FIG. 2. The apparatus may be specifically applied to a server.

As shown in FIG. 5, the apparatus 500 for storing time series data according to this embodiment includes a data storage unit 501, a data compression unit 502, and a data writing unit 503. The data storage unit 501 is configured to save an index value of time series data to a time interval data table according to a time point of the time series data, where the time series data includes the following information: a time point and an index value associated with the time point, each data row in the time interval data table records index values associated with at least one time point within a time interval of a predetermined length, the time points in the at least one time point are spaced by a predetermined time length, each time point occupies one storage area of a memory, each storage area includes a predetermined quantity of bytes, and the index value associated with each time point is filled in the storage area occupied by the time point. The data compression unit 502 is configured to perform data compression processing on a storage area having no written data, to obtain compressed time interval data. The data writing unit 503 is configured to write the compressed time interval data to a magnetic disk.

In this embodiment, the time interval data table may include a primary key column, and the primary key value of each data row in the time interval data table may include a starting time point value indicating the starting point of the time interval corresponding to the data row. The data storage unit 501 may include:

a data row searching subunit 5011, configured to search, in the time interval data table according to the time point of the time series data, for a data row corresponding to a time interval including the time point of the time series data;

a data writing subunit 5012, configured to: if the corresponding data row is found, writing the index value of the time series data to the storage area in the data row that corresponds to the time point; and a data row adding subunit 5013, configured to: if the data row is not found, add a new data row, where a primary key value of the new data row includes the time point of the time series data, and data written to the first storage area of the new data row is the index value of the time series data.

The time interval data table may further include an index value data set column used for recording the index values of the at least one time point.

Specific implementation of the data storage unit 501 can be referred to the detailed description of step 201 in the embodiment corresponding to FIG. 2, and will not be repeatedly described here.

In this embodiment, the data storage unit 501 uses the index value data set column to record the index values of the at least one time point, the index value data set column is further be used for recording storage area status information, where the storage area status information in each data row in the time interval data table includes a serial number of each storage area in the data row and an occupation status of the storage area corresponding to the serial number, and the occupation status indicates whether there is data written to the storage area. In addition, the data compression unit 502 may be further configured to perform data compression processing on a storage area that is in an idle state.

Specific implementation of the data compression unit 502 can be referred to the detailed description of step 202 in the embodiment corresponding to FIG. 2, and will not be repeatedly described here.

In this embodiment, specific implementation of the data writing unit 503 can be referred to the detailed description of step 203 in the embodiment corresponding to FIG. 2, and will not be repeatedly described here.

In some implementations of this embodiment, the time series data may further include data source subject identification code information, where the data source subject identification code information is an identification code of a source subject of the time series data. Correspondingly, the primary key value of the each data row further includes a data source subject identification code, where the data source subject identification code is an identification code of a source subject of index value data of the data row. The data row searching subunit 5011 may be further configured to search, in the time interval data table according to the time point and the data source subject identification code of the time series data, for a data row that corresponds to a time interval including the time point of the time series data and of which the primary key value includes the data source subject identification code of the time series data. In addition, the primary key value of the new data row added by the data row adding subunit 5013 may further include the data source subject identification code of the time series data.

Specific implementations of the data row searching subunit 5011 and the data row adding subunit 5013 in this implementation can be referred to the detailed descriptions of step 401 and step 403 in the embodiment corresponding to FIG. 4, and will not be repeatedly described here.

In some implementations of this embodiment, the time series data may further include information about an index identification code, where the index identification code is an identification code of an index corresponding to the index value of the time series data. Correspondingly, the primary key value of each data row may further include an index identification code, where the index identification code is an identification code of an index corresponding to the index value recorded in the data row. The data row searching subunit 5011 may be further configured to search, in the time interval data table according to the time point, the data source subject identification code and the index identification code of the time series data, for a data row that corresponds to a time interval including the time point of the time series data and of which the primary key value includes the data source subject identification code and the index identification code of the time series data. In addition, the primary key value of the new data row added by the data row adding subunit 5013 may further include the index identification code of the time series data.

Specific implementations of the data row searching subunit 5011 and the data row adding subunit 5013 in this implementation can be referred to the detailed descriptions of the corresponding implementations in the embodiment corresponding to FIG. 4, and will not be repeatedly described here.

According to the apparatus for storing time series data as provided in the present application, before data is written to a magnetic disk, the data compression unit 502 performs data compression processing on a storage area having no written data, thereby reducing the occupation of the storage space of the magnetic disk and reducing the IO traffic during subsequent data read/write.

It should be appreciated by those skilled in the art that the apparatus 500 for storing time series data further includes some other well-known structures, for example, a processor and a memory. Such well-known structures are not shown in FIG. 5 so as to not unnecessarily obscure the embodiments of the disclosure.

Figure 6:
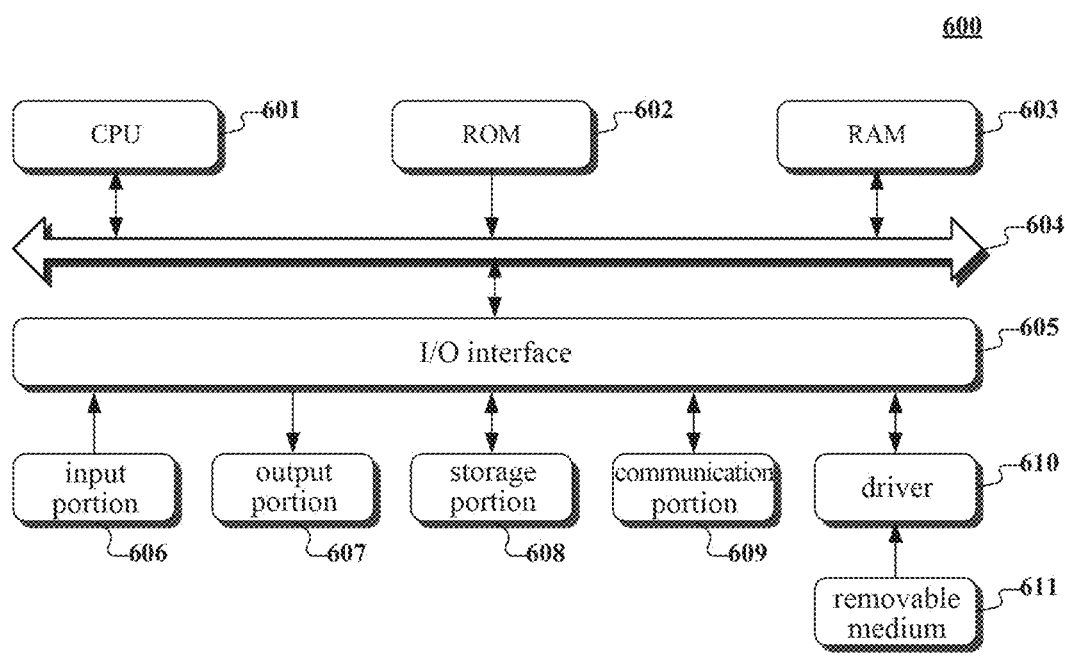
FIG. 6 illustrates a structural schematic diagram of a computer system adapted to implement a method and apparatus for storing time series data according to the embodiments of the present application.

Referring to FIG. 6, a schematic structural diagram of a computer system 600 adapted to implement a server of the embodiments of the present application is shown.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present application may be implemented by means of software or hardware. The described units or modules may also be provided in a processor, for example, described as: a processor, comprising a data storage unit, a data compression unit and a data writing unit, where the names of these units do not in some cases constitute a limitation to such units or modules themselves. For example, the data storage unit may also be described as "a unit for storing time series data."

In another aspect, the present application further provides a non-volatile computer-readable storage medium. The non-volatile computer-readable storage medium may be the non-volatile computer storage medium included in the apparatus in the above described embodiments, or a stand-alone non-volatile computer-readable storage medium not assembled into the apparatus. The non-volatile computer-readable storage medium stores one or more programs. The one or more programs, when executed by a device, cause the device to: save an index value of time series data to a time interval data table according to a time point of the time series data, wherein the time series data comprises the following information: a time point and an index value associated with the time point, each data row in the time interval data table records index values associated with at least one time point within a time interval of a predetermined length, the time points in the at least one time point are spaced by a predetermined time length, each time point occupies one storage area of a memory, each storage area comprises a predetermined quantity of bytes, and the index value associated with the each time point is filled in the storage area occupied by the time point; perform data compression processing on a storage area having no written data, to obtain compressed time interval data; and write the compressed time interval data to a magnetic disk.

The above description only provides an explanation of the preferred embodiments of the present application and the technical principles used. It should be appreciated by those skilled in the art that the inventive scope of the present application is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present application are examples.

What is claimed is:

1. A method for storing time series data, comprising:
    saving an index value of time series data to a time interval data table according to a time point of the time series data, wherein the time series data comprises following information: a time point and an index value associated with the time point, each data row in the time interval data table records index values associated with at least one time point within a time interval of a predetermined length, the time points in the at least one time point are spaced by a predetermined time length, each time point occupies one storage area of a memory, each storage area comprises a predetermined quantity of bytes, and the index value associated with the each time point is filled in the storage area occupied by the time point;
    performing data compression processing on a storage area having no written data, to obtain compressed time interval data; and
    writing the compressed time interval data to a magnetic disk.

2. The method according to claim 1, wherein the time interval data table comprises a primary key column, and the primary key value of the each data row in the time interval data table comprises a starting time point value indicating the starting point of the time interval corresponding to the data row.

3. The method according to claim 2, wherein the saving an index value of time series data to a time interval data table according to a time point of the time series data comprises:
    searching, in the time interval data table according to the time point of the time series data, for a data row corresponding to the time interval comprising the time point of the time series data;
    if a corresponding data row is found, writing the index value of the time series data to the storage area in the data row corresponding to the time point; and
    if the data row is not found, adding a new data row, wherein a primary key value of the new data row comprises the time point of the time series data, and data written to the first storage area of the new data row is the index value of the time series data.

4. The method according to claim 3, wherein the time series data further comprises data source subject identification code information, wherein the data source subject identification code information is an identification code of a source subject of the time series data.

5. The method according to claim 4, wherein the primary key value of the each data row further comprises a data source subject identification code, wherein the data source subject identification code is an identification code of a source subject of index value data of the data row.

6. The method according to claim 5, wherein the searching, in the time interval data table according to the time point of the time series data, for a data row corresponding to a time interval comprising the time point of the time series data comprises:
    searching, in the time interval data table, according to the time point and the data source subject identification code of the time series data, for the data row corresponding to the time interval comprising the time point of the time series data, and of which the primary key value comprises the data source subject identification code of the time series data.

7. The method according to claim 5, wherein the primary key value of the new data row further comprises the data source subject identification code of the time series data.

8. The method according to claim 5, wherein the time series data further comprises information about an index identification code, wherein the index identification code is an identification code of an index corresponding to the index value of the time series data.

9. The method according to claim 8, wherein the primary key value of the each data row further comprises a index identification code, wherein the index identification code is an identification code of an index corresponding to the index value recorded in the data row.

10. The method according to claim 9, wherein the searching, in the time interval data table according to the time point of the time series data, for a data row corresponding to a time interval comprising the time point of the time series data comprises:
    searching, in the time interval data table according to the time point, the data source subject identification code and the index identification code of the time series data, for the data row corresponding to the time interval comprising the time point of the time series data, and of which the primary key value comprises the data source subject identification code and the index identification code of the time series data.

11. The method according to claim 9, wherein the primary key value of the new data row further comprises the index identification code of the time series data.

12. The method according to claim 2, wherein the time interval data table further comprises an index value data set column used for recording the index values of the at least one time point.

13. The method according to claim 12, wherein the index value data set column is further used for recording storage area status information, wherein the storage area status information in each data row in the time interval data table comprises an occupation status of each storage area in the data row, and the occupation status indicates whether there is data written to the storage area; and the performing data compression processing on a storage area having no written data comprises: performing data compression processing on a storage area that is in an idle state.

14. A device comprising:
a processor; and
a memory storing computer readable instructions that can be executed by the processor, the computer readable instructions when executed by the processor, causing the processor to:
save an index value of time series data to a time interval data table according to a time point of the time series data, wherein the time series data comprises the following information: a time point and an index value associated with the time point, each data row in the time interval data table records index values associated with at least one time point within a time interval of a predetermined length, the time points in the at least one time point are spaced by a predetermined time length, each time point occupies one storage area of a memory, each storage area comprises a predetermined quantity of bytes, and the index value associated with each time point is filled in the storage area occupied by the time point;
perform data compression processing on a storage area having no written data, to obtain compressed time interval data; and
write the compressed time interval data to a magnetic disk.

15. The device according to claim 14, wherein the time interval data table comprises a primary key column, and the primary key value of the each data row in the time interval data table comprises a starting time point value indicating the starting point of the time interval corresponding to the data row.

16. The device according to claim 15, wherein the saving of an index value of time series data to a time interval data table according to a time point of the time series data comprises:

searching, in the time interval data table according to the time point of the time series data, for a data row corresponding to the time interval comprising the time point of the time series data;

if a corresponding data row is found, writing the index value of the time series data to the storage area in the data row corresponding to the time point; and if the data row is not found, adding a new data row, wherein a primary key value of the new data row comprises the time point of the time series data, and data written to the first storage area of the new data row is the index value of the time series data.

17. The device according to claim 16, wherein the time series data further comprises data source subject identification code information, wherein the data source subject identification code information is an identification code of a source subject of the time series data.

18. The device according to claim 17, wherein the primary key value of the each data row further comprises a data source subject identification code, wherein the data source subject identification code is an identification code of a source subject of index value data of the data row.

19. The device according to claim 18, wherein the searching, in the time interval data table according to the time point of the time series data, for a data row corresponding to a time interval comprising the time point of the time series data comprises:

searching, in the time interval data table, according to the time point and the data source subject identification code of the time series data, for the data row corresponding to the time interval comprising the time point of the time series data, and of which the primary key value comprises the data source subject identification code of the time series data.

20. The device according to claim 18, wherein the primary key value of the new data row further comprises the data source subject identification code of the time series data.

21. The device according to claim 18, wherein the time series data further comprises information about an index identification code, wherein the index identification code is an identification code of an index corresponding to the index value of the time series data.

22. The device according to claim 21, wherein the primary key value of the each data row further comprises a index identification code, wherein the index identification code is an identification code of an index corresponding to the index value recorded in the data row.

23. The device according to claim 22, wherein the searching, in the time interval data table according to the time point of the time series data, for a data row corresponding to a time interval comprising the time point of the time series data comprises:

searching, in the time interval data table according to the time point, the data source subject identification code and the index identification code of the time series data, for the data row corresponding to the time interval comprising the time point of the time series data, and of which the primary key value comprises the data source subject identification code and the index identification code of the time series data.

24. The device according to claim 22, wherein the primary key value of the new data row further comprises the index identification code of the time series data.

25. The device according to claim 15, wherein the time interval data table further comprises an index value data set column used for recording the index values of the at least one time point.

26. The device according to claim 25, wherein the index value data set column is further used for recording storage area status information, wherein the storage area status information in each data row in the time interval data table comprises an occupation status of each storage area in the data row, and the occupation status indicates whether there is data written to the storage area; and the performing of data compression processing on a storage area having no written data comprises: performing data compression processing on a storage area that is in an idle state.

27. A non-transitory computer storage medium storing computer readable instructions that can be executed by a processor, the computer readable instructions when executed by the processor, causing the processor to:

save an index value of time series data to a time interval data table according to a time point of the time series data, wherein the time series data comprises the following information: a time point and an index value associated with the time point, each data row in the time interval data table records index values associated with at least one time point within a time interval of a predetermined length, the time points in the at least one time point are spaced by a predetermined time length, each time point occupies one storage area of a memory, each storage area comprises a predetermined quantity of bytes, and the index value associated with each time point is filled in the storage area occupied by the time point;

perform data compression processing on a storage area having no written data, to obtain compressed time interval data; and write the compressed time interval data to a magnetic disk.

* * * * *